Figure 1:
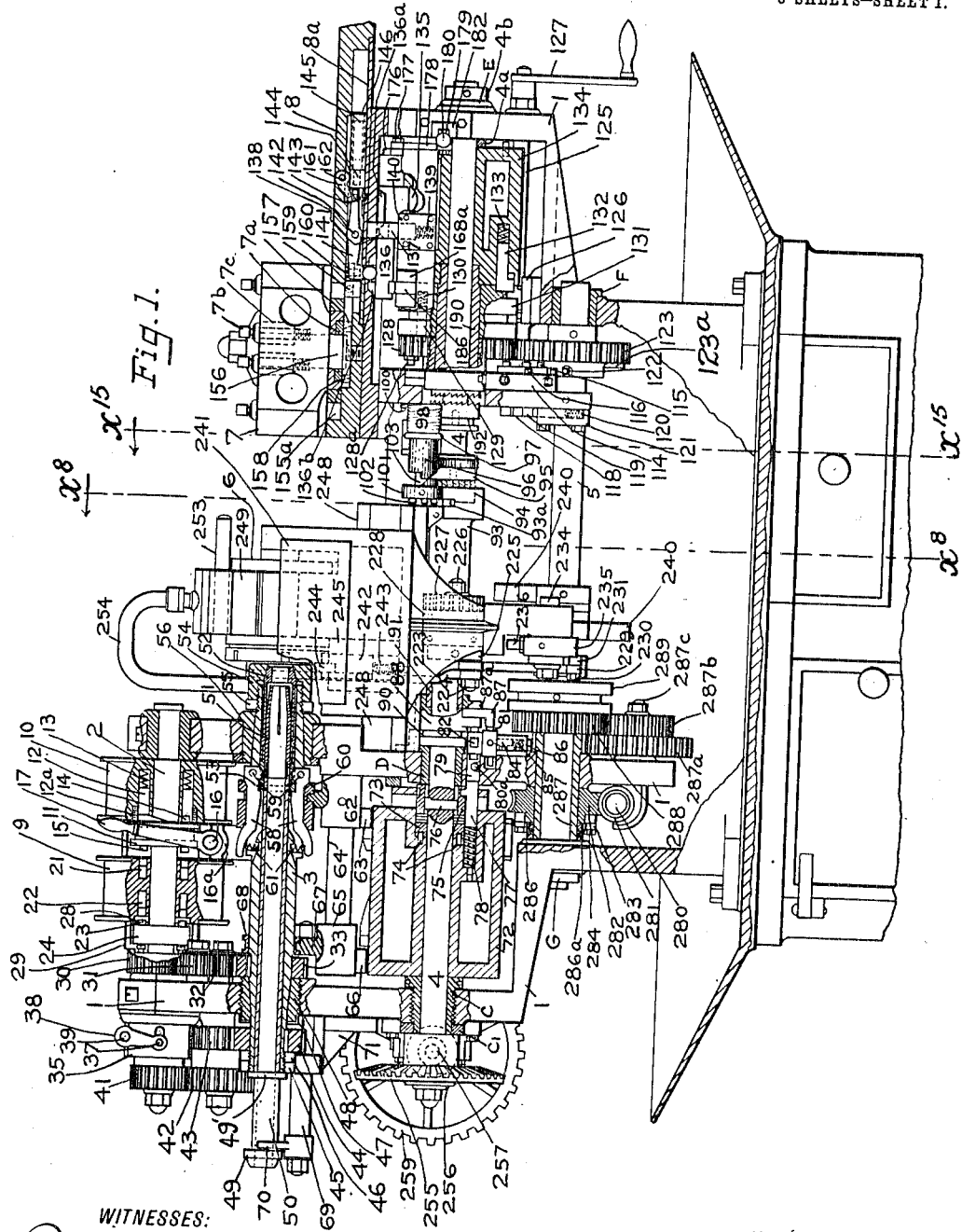

J. D. MATTISON.
FORMING MACHINE.
APPLICATION FILED DEC. 29, 1905.

1,080,360.

Patented Dec. 2, 1913.
8 SHEETS—SHEET 1.

WITNESSES:

INVENTOR
James D. Mattison
BY
ATTORNEY

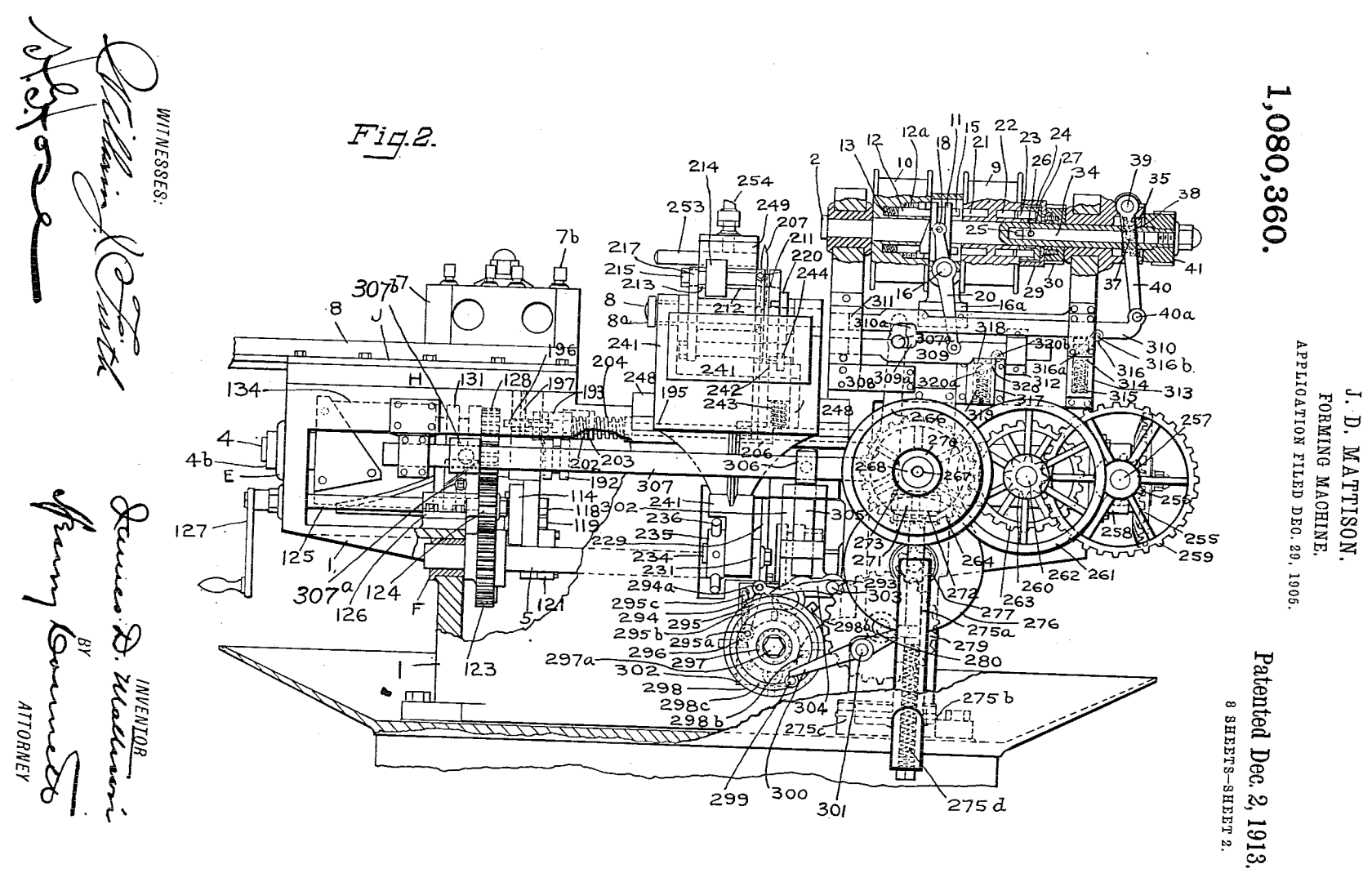

J. D. MATTISON.
FORMING MACHINE.
APPLICATION FILED DEC. 29, 1905.

1,080,360.

Patented Dec. 2, 1913.
8 SHEETS—SHEET 2.

Fig. 2.

WITNESSES:

INVENTOR
James D. Mattison
BY
Henry Connett
ATTORNEY

J. D. MATTISON.
FORMING MACHINE.
APPLICATION FILED DEC. 29, 1905.
1,080,360.
Patented Dec. 2, 1913.
8 SHEETS—SHEET 3.
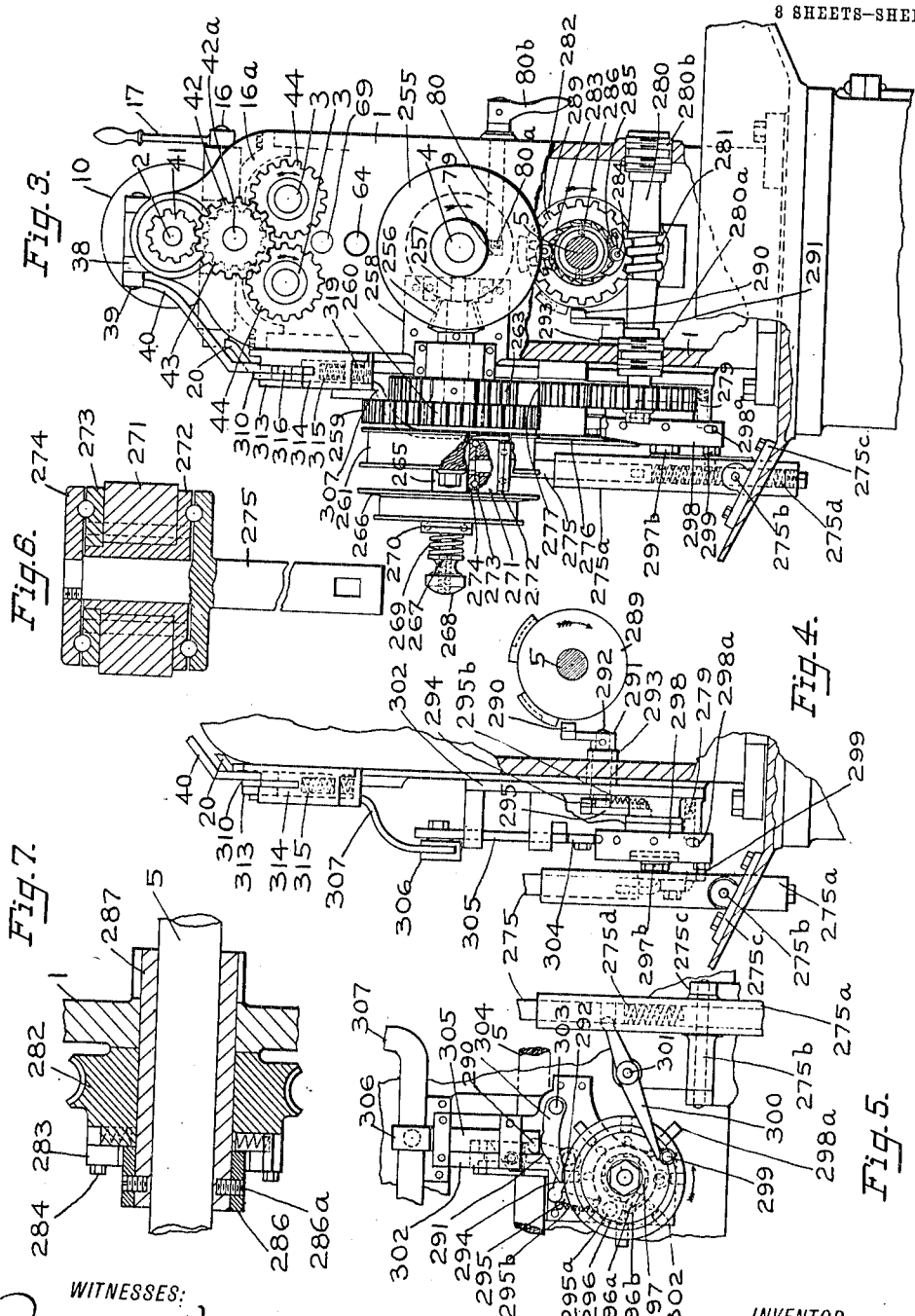
WITNESSES:
INVENTOR
James D. Mattison
BY
ATTORNEY J. D. MATTISON.
FORMING MACHINE.
APPLICATION FILED DEC. 29, 1905.
1,080,360.
Patented Dec. 2, 1913.
8 SHEETS—SHEET 4.
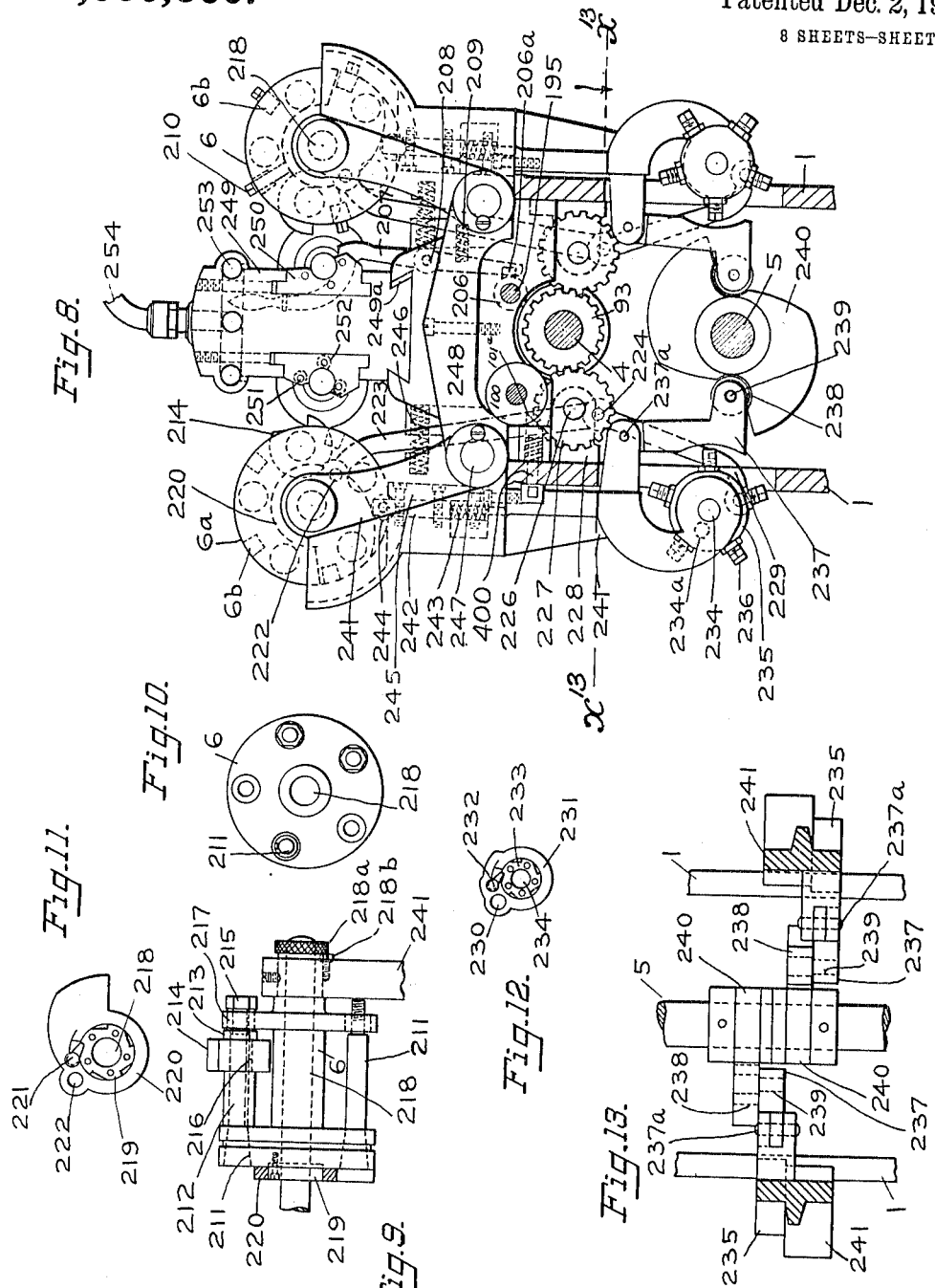

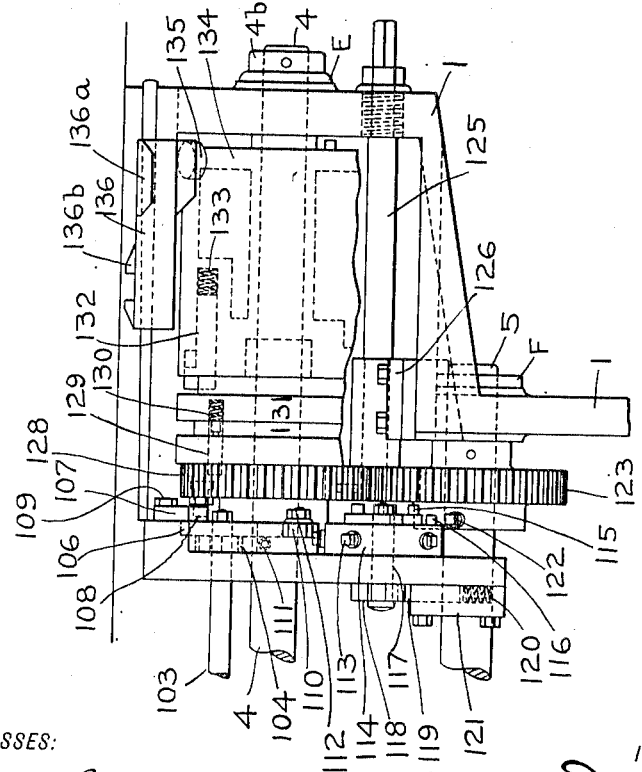

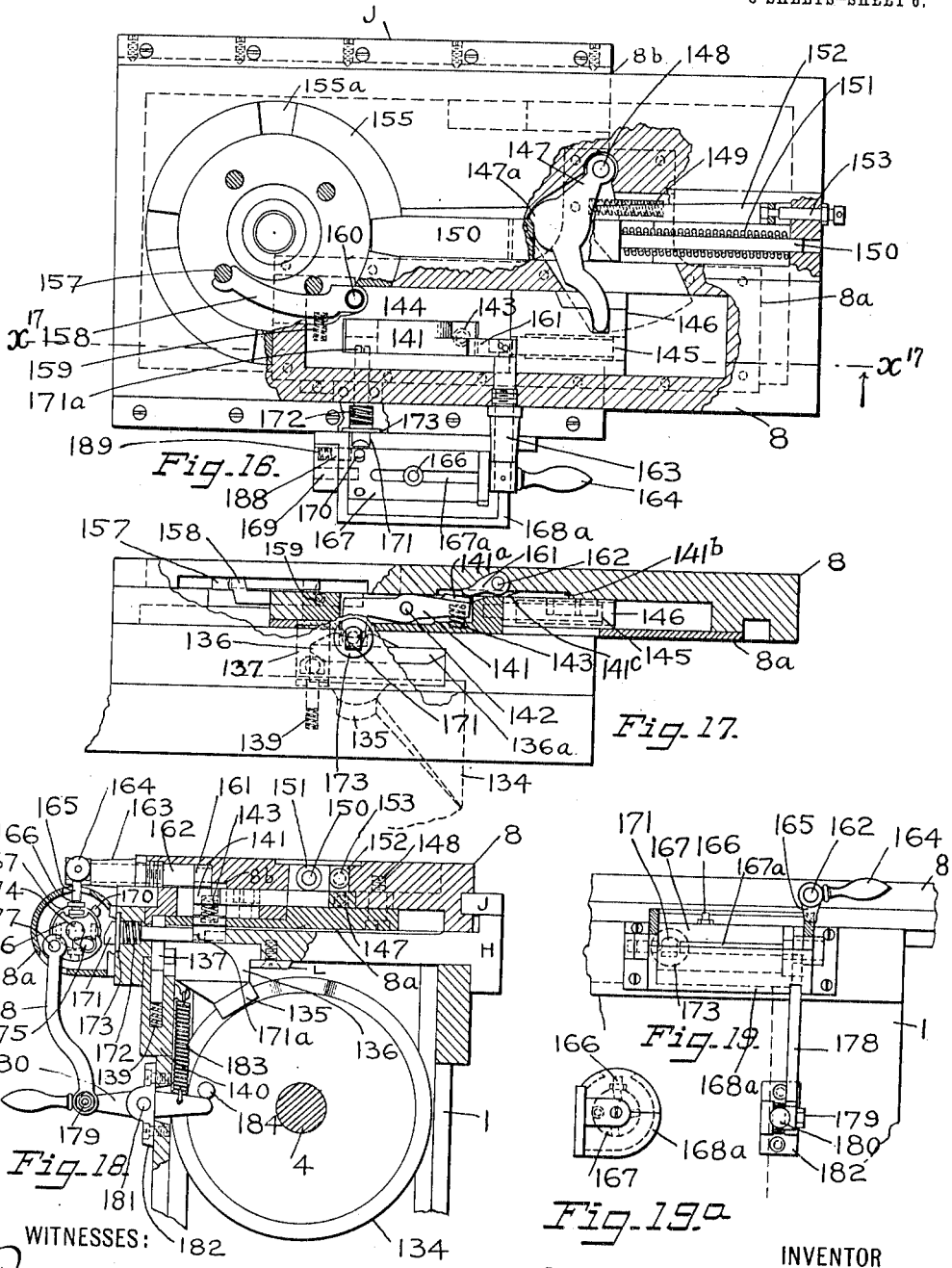

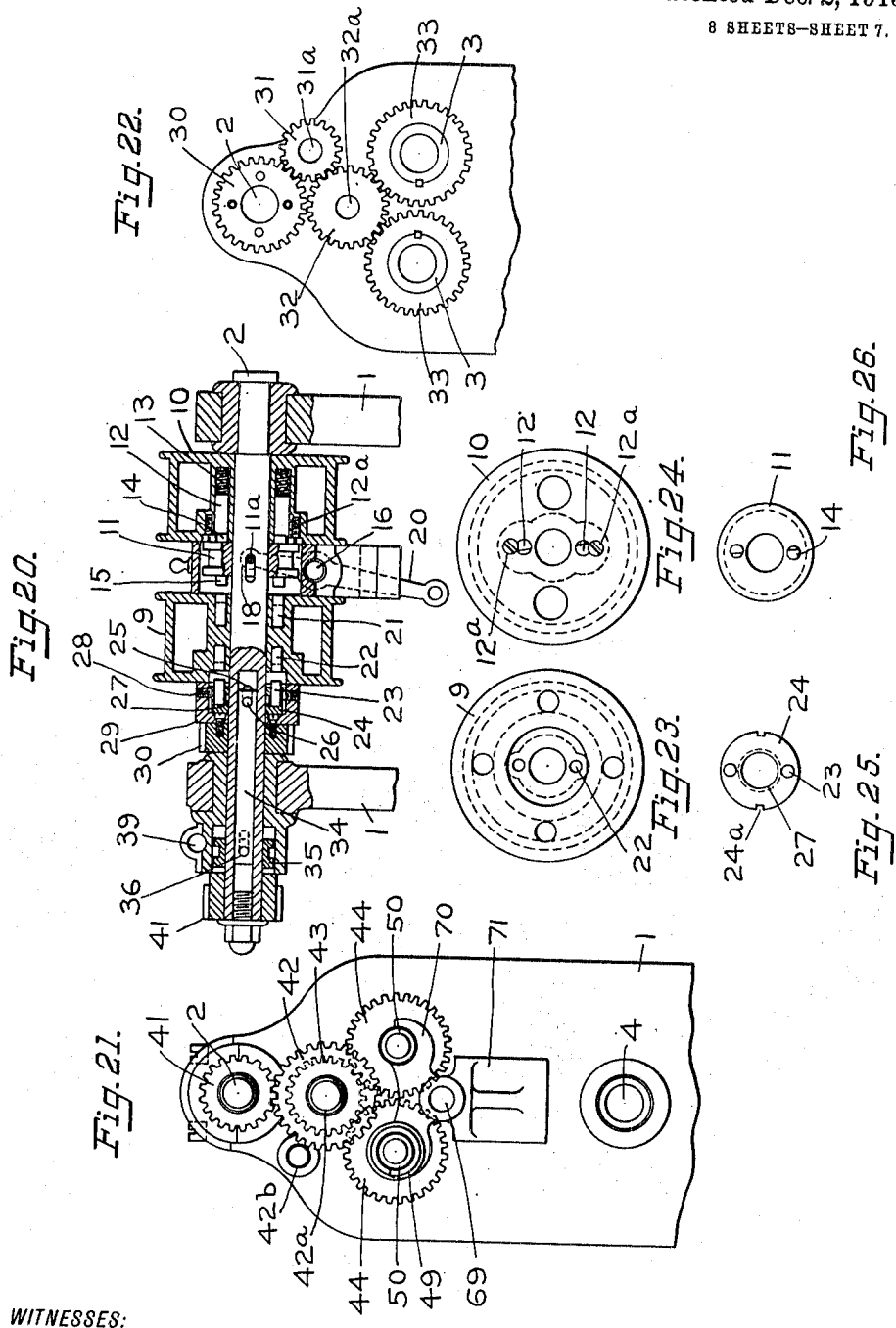

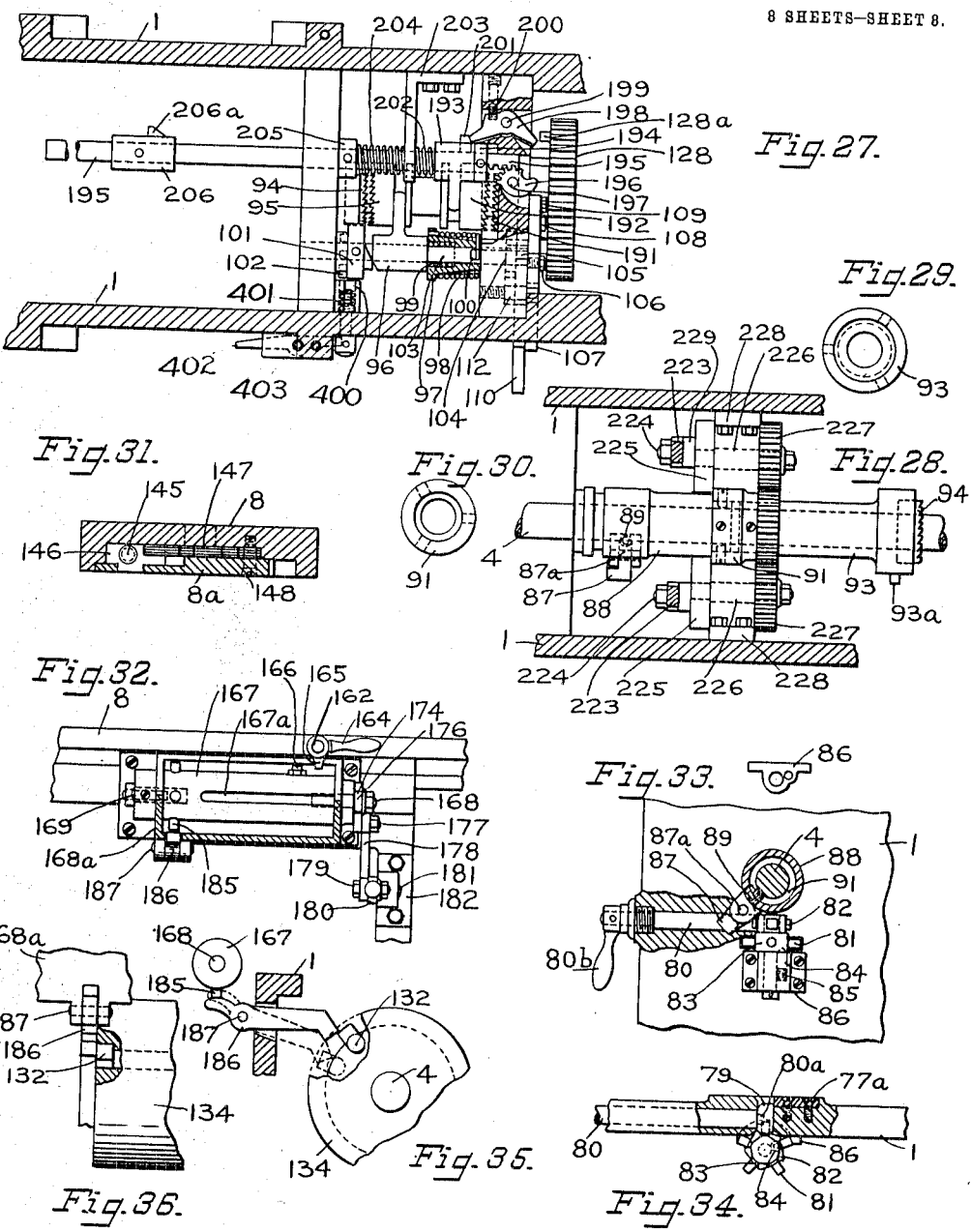

UNITED STATES PATENT OFFICE.

JAMES D. MATTISON, OF ORANGE, NEW JERSEY.

FORMING-MACHINE.

1,080,360. Specification of Letters Patent. Patented Dec. 2, 1913.

Application filed December 29, 1905. Serial No. 293,864.

*To all whom it may concern:*

Be it known that I, JAMES D. MATTISON, a citizen of the United States, residing in Orange, in the county of Essex and State of New Jersey, have invented certain new and useful Improvements in Forming-Machines, of which the following is a specification.

This invention relates to the class of machines employed for automatically forming articles in multiple, and exactly alike, from a bar of metal or the like (usually called "stock") fed through a tubular spindle to cutters or shaping tools. In the machine herein illustrated there are two spindles and two sets of cutters, which increase the capacity of the machine fourfold. The spindles are not superposed or disposed one above the other, but placed abreast in the same horizontal plane, so that the chips or cuttings from one will not fall on the other. The invention is not, however, restricted in all respects to this double construction and disposition of the spindles.

The object of the invention is to improve the automatic facilities of the machine in the main, and the construction will be hereinafter fully described with reference to the accompanying drawings, and its novel features carefully defined in the claims.

In the said drawings, which illustrate an embodiment of the invention:—Figure 1 is, substantially, a longitudinal, vertical mid-section of the machine, looking from front to rear; the end to the left, where the driving mechanism is situated being considered the head-end. Fig. 2, is, substantially, a rear elevation of the machine, the driving mechanism being shown in section and part of the main frame broken away. Fig. 3 is an elevation of the head-end of the machine with some parts omitted and broken away. Fig. 4 is a fragmentary transverse, vertical section looking toward the left in Fig. 1. This figure will be hereinafter more fully described. Fig. 5 is a fragmentary detail view of a part of the mechanism which will be hereinafter described. Fig. 6 is an enlarged sectional detail view of the wheel 271, which will be hereinafter described. Fig. 7 is an enlarged sectional detail view of the worm-wheel 282 and its ratchet device. Fig. 8 is a vertical, transverse section of the machine taken substantially at line $x^8$ in Fig. 1 and looking toward the left. Figs. 9 and 10 are, respectively, a side and end elevation of the cutter-head, detached; and Fig. 11 is a detail view of the ratchet device on the cutter-head. Fig. 12 is a detached detail view of the ratchet-device of the wheel 235, seen in Fig. 8. Fig. 13 is a fragmentary sectional plan taken substantially at line $x^{13}$ in Fig. 8, showing the parts below said line. Fig. 14 is a front elevation of the mechanism at the right in Fig. 1, drawn to a larger scale than said figure. Fig. 15 is a vertical transverse section, on the same scale as Fig. 14, taken substantially at line $x^{15}$ in Fig. 1 and looking to the right. Fig. 16 is a dissected plan view, enlarged, of the turret slide and mechanism, the turret itself being omitted. Fig. 17 is a longitudinal vertical section taken at line $x^{17}$ in Fig. 16. Fig. 18 is a transverse vertical section showing the parts seen in Figs. 16 and 17, and looking from the right in Fig. 16. Fig. 19 is a side elevation of the device controlling the turret slide, seen at bottom of Fig. 16; and Fig. 19ᵃ is a view of the left-hand end of same. Fig. 20 is an enlarged sectional view of the pulley shaft and driving pulleys. Fig. 21 is an enlarged view of the gearing at the head-end of the machine, showing the shipper which is omitted in Fig. 3. Fig. 22 is a view similar to Fig. 21, showing the reversing gears for the spindles seen at the left of the pulley 9 in Fig. 1. The view is from left to right in Fig. 1. Figs. 23 and 24, are, respectively, end views, enlarged, of the pulleys 9 and 10. Figs. 25 and 26 are enlarged and detached detail views of parts of the pulley-clutches. Fig. 27 is a sectional plan view of the mechanism connecting the shafts 4 and 5 and for operating the cutter-heads. Fig. 28 is a sectional plan view of the mechanism for controlling and operating the cutter heads. Figs. 29 and 30 are end views of the sleeve-sections seen in Fig. 28. Fig. 31 is a transverse section of the turret-slide. Fig. 32 is a view similar to Fig. 19 but having the casing 168ᵃ broken away. Fig. 33 is a vertical section of a detail of the device for controlling the drum 72 for shipping the stock. The bracket 86 is shown separately in this figure. Fig. 34 is a plan view of a part of the mechanism seen in Fig. 33. Figs. 35 and 36 are, respectively, fragmentary end and side views of the drum 134 and its controlling mechanism.

Like reference numerals indicate corresponding parts in the different figures of the drawings.

1 is the frame of the machine; 2 is the shaft carrying the driving pulleys; 3 are spindles, of which there are two disposed side-by-side or abreast; 4 is the central shaft; 5 is the lower, or cam-shaft; 6 are the cutter-heads, of which there are two; 7 is the turret, and 8 the turret-slide.

On the pulley-shaft are rotatively mounted two pulleys, 9 and 10, which will be driven in the same direction but at different rates of speed. The former is the slower pulley and the latter the faster. These pulleys are coupled to the shaft by clutches, as will now be explained.

Referring particularly to Figs. 2 and 20, the reference numeral 11 indicates a clutch which is provided with a pin 11ª extending through the pulley shaft 2, so as to cause the clutch and shaft to rotate together and at the same time permit the clutch to be moved longitudinally on the shaft. On one end, the clutch 11 is provided with pins or lugs 14 which are adapted, when the clutch 11 is moved toward the pulley 10, to engage the ends of pins 12, Fig. 24 slidably mounted in sockets in the pulley 10 and held in place by screws 12ª and backed by coil springs 13. The pins 12 are adapted to take up the back lash when the clutch 11 is moved out of disengagement with the pulley 10. In addition to the lugs 14, the clutch 11 is provided on its opposite side with lugs 15 adapted to fit into suitable sockets or engage suitable pins 21 in the slow pulley 9. The clutch 11 is shifted longitudinally upon the shaft 2 by means of a lever 20 journaled upon a stud 16 fitted into a block or bridge piece 16ª, and having a pin at its upper end fitting into the annular groove formed in said clutch 11.

The reference numeral 24 indicates a clutch which is formed internally with an annular groove 27 into which fits a pin 26 mounted in the end of a slidable rod 34 located in a longitudinal bore formed in the shaft 2. The pin 26 projects through a slot 25 formed in the shaft 2 to permit sliding movement of the rod 34. It will be evident that the clutch 24 is loosely mounted on the shaft 2 but is capable of being shifted longitudinally by means of the rod 34. The clutch 24 is provided with pins 23 which are adapted to enter suitable sockets or engage suitable pins 22 in the slow pulley 9. The clutch 24 is formed in its periphery with longitudinal spline grooves 24ª, Fig. 25, into which project screws 28 extending through a clutch casing 29. The clutch casing 29 is secured by means of screws to a gear wheel 30 which is mounted loosely upon the shaft 2. It will be apparent that when the clutch 24 is moved into engagement with the pulley 9, said pulley causes the gear wheel 30 to rotate. As shown in Fig. 22, the gear wheel 30, through a train of gearing comprising the gear wheel 31 on the stud shaft 31ª, the gear wheel 32 on the stud shaft 32ª and the gear wheels 33, serves to rotate the spindles 3 in a reverse direction, when the gear wheel 30 and the pulley 9 are locked together.

The slidable rod 34 which moves the clutch 24, is connected at its opposite end with a clutch 35 by means of a pin 36 extending through a suitable slot in the shaft 2. The clutch 35 is formed in its periphery with the usual annular groove into which projects a pin 37 on a short lever 38, as shown in Figs. 1 and 2. The lever 38 is mounted on a short shaft 39 to the opposite end of which is attached a lever 40.

As shown in Fig. 20, the clutch 35 is adapted to be moved into engagement with the gear wheel 41 mounted loosely on the shaft 2. The gear wheel 41 operates the spindles 3 through suitable gearing 42, 43, 44, the wheels 42 and 43 being mounted on the stud shaft 42ª.

From the foregoing description in connection with the drawings it will be apparent that the spindles can be rotated forward at two different speeds by first moving the clutch 35 into engagement with the gear wheel 41 and then moving the clutch 11 into engagement with either the fast pulley 10 or the slow pulley 9. Furthermore, it will be apparent that the spindles can be reversed by throwing the clutch 24 into engagement with the pulley 9.

While the two spindles 3 may be constructed in any manner suitable for the purpose, said spindles preferably are constructed as illustrated in Fig. 1 of the drawing. That is to say each of the spindles is formed with coned portions adjacent to its ends. The coned portions of the spindles, as clearly shown in the drawing, are mounted to revolve in suitable coned bushings 48 and 56 which are secured in the machine frame. The coned bushings 48 and 56 prevent the spindles from moving longitudinally backward or forward, but permit them to rotate freely. Each of the spindles is provided with an internal feed sleeve 50 having at the forward end thereof a sleeve section 51 which is longitudinally split or slotted at its forward end so as to grip the stock and feed it forward whenever necessary. The feed sleeves 50 of the two spindles are each provided with a collar 49 and are engaged by a bridge piece 70 mounted upon a longitudinally movable rod 69, said bridge-piece 70 being adapted to slide back and forth between the collar 49 and the collar 49' on the sleeve 50, so that when it strikes the collar 49 it will slide the sleeve 50 to the left in Fig. 1, and when it strikes the collar 49' it will move said sleeve to the right in Fig. 1. The parts are shown in Fig. 1 as adapted to give the sleeve 50 a very slight backward and forward movement, but by arranging collars 49 and 49' closer together on the sleeve 50, a greater backward and forward movement of said sleeve can be secured, depending upon the kind of work to be done by the machine. The rod 69 is connected in any suitable manner with a block 65 which is loosely mounted to slide to and fro upon a rod 64 which is slidably mounted in the machine frame. The block 65 is prevented from rotating accidentally upon the rod 64 by means of a member 67 shaped in any suitable manner to engage a collar 68 slidably mounted upon each of the spindles 3. The block 65 is formed or provided with a lug 66 which is adapted to be engaged by a cam projection upon the cam drum 72 which is loosely mounted upon the shaft 4 and adapted to be periodically clutched therewith and rotated at proper intervals as hereinafter described. Whenever the cam projection on the cam drum 72 engages the lug 66, the block 65 is moved to the right on the rod 64, thus moving the rod 69 as well as the collar 68 to the right, and causing the bridge piece 70 to move the feed sleeve 50 of each spindle to the right. Each feed sleeve 50 is properly moved to the left through the block 65 and sleeve 69 by means of a second cam projection on the cam drum 72.

The means by which the stock is clamped and held securely in position within the spindle when it has been fed forward by the feed sleeve 50 in the manner described, so as not only to permit the sleeve 50 to be withdrawn into position to feed the stock forward the next time such action is necessary, but also to cause the stock to rotate with the spindle, preferably comprises a sleeve 60 which is longitudinally movable upon the spindle. The sleeve 60 is moved longitudinally at proper intervals by means of a block 62 which engages said sleeve 60 in any suitable manner and is rigidly mounted to move back and forth with the slidable rod 64. The block 62 is provided with a lug 63 which is adapted to be engaged by suitable cam projections upon the drum 72, whereby the block 62 and sleeve 60 are moved back and forth at proper intervals. A plurality of levers 58 are pivotally mounted as shown at 59 in suitable slots formed in the spindle 3. Each of the levers 58 is forced outwardly under normal conditions by a small coil spring 61. The levers 58 are surrounded by a collar 60 and are shaped in such a manner that when the collar or sleeve 60 is shifted to the left in Fig. 1 by the cam drum 72, the free ends of said levers 78 are forced inward. Whenever said levers are forced inward as described, their heel ends, which fit into a suitable annular groove in a sleeve carrying at its outer end the chuck members 52, is moved to the right, so as to cause the chuck members 52 to become jammed in the contracted end of the chuck sleeve 54 and thus grip the stock so as to cause it to rotate with the spindle and also to permit the sleeve 50 to be drawn backward into position to feed the stock forward on the next operation. It will be understood that the cam projections on the cam drum 72 are so arranged that the chuck or grip mechanism and the feeding mechanism will be alternately operated. That is to say, the chuck mechanism will always be automatically operated to loosen its grip on the stock while the feed sleeve 50 is moved forward, and said chuck mechanism will always grip the stock and hold it while the feed sleeve 50 is moving backward.

In view of the fact that the shaft 4, on each revolution thereof operates a cutter head hereinafter to be described, so as to bring into position a new cutter to operate on the stock, it is necessary that the cam drum 72 be operated but once while the shaft 4 rotates several times. That is to say if four different cutters are to be successively brought into operation on the stock before the same is fed forward in the spindle, it is necessary that the cam drum 72 be caused to stand still during four successive revolutions of the shaft 4, and that said drum be then clutched and caused to rotate so as to feed the stock forward into position for the next successive operation of the four cutters. The mechanism for accomplishing this result is illustrated in Figs. 1, 28, 33 and 34 of the drawing. Mounted upon a sleeve 88 which surrounds the shaft 4 and is adapted to be clutched thereon at suitable intervals as hereinafter described, is a pair of ears or lugs 87$^a$ between which is pivotally mounted a laterally extending arm or lever 87. Connected with the inner end of the lever 87, in any suitable manner, is a coil spring 89 which gives the lever 87 sufficient rigidity to strike and partially rotate a star wheel hereinafter described, but permits said lever to yield in the event that the star wheel refuses to turn, whereby any breakage of parts is prevented. The star wheel which is partially rotated by the lever 87 upon each rotation of the shaft 4 and sleeve 88 is indicated by 83 and is provided with a suitable number of radially extending pins 81. The star wheel 83, as shown in Fig. 33, is mounted on a stud shaft suitably journaled in a bracket 86 connected with the machine frame 1. Mounted in the bracket 86 is a small pin 84 which is backed by a coil spring 85 and is adapted to engage any one of a series of sockets formed in the star wheel 83 so as to prevent said star wheel from moving more than one step at a time as the pins 81 are successively engaged by the lever 87 in the manner described. Formed integral with the star wheel 83 is a second and smaller star wheel containing removable radial projections or studs 82 which if desired may be beveled at their outer ends as indicated in Fig. 34. The number of revolutions which the shaft 4 will make before operating the cam drum 72 is regulated by the number of pins 82. As the star wheel 83 rotates in a step by step manner, the projections or studs 82 force in the direction of the cam drum 78 a small sliding member or push pin 79. The small sliding member 79 in turn bears against a slidable rod or locking bolt 77 mounted in the cam drum 72 and backed by a coil spring 78. The locking bolt 77 is formed with a lateral projection which fits into an annular groove formed in a clutch member 75 splined upon the shaft 4 by means of a pin 76. The clutch member 75, which is formed with suitable teeth as indicated in Fig. 1, is adapted to engage a similar clutch member 73 secured to the drum 72 by means of pins or screws 74. The operation of the parts is as follows. Upon each revolution of the shaft 4 and sleeve 88, the lever 87 moves the star wheel 83 one step. When the star wheel 83, has been rotated to the proper point, one of the projections 82 moves the sliding member 79 which in turn forces back the slidable rod or bolt 77. It may be explained that while the drum 72 is at rest, the end of the bolt 77 opposite the coil spring 78, fits into the end of the bore in which the slidable member 79 is mounted, as shown in Fig. 1, so that the drum 72 is locked by the pin 77 against accidental rotation. When the slidable member, actuated by the projections 82 on the star wheel, forces the pin 77 backward until its end leaves the bore of the member 79, the clutch member 75 is thrown into engagement with the clutch member 73, and the drum 72 begins to rotate with the shaft 4 on which the clutch member 75 is splined as previously described. As soon as the drum 72 begins to rotate and consequently moves the bolt 77 out of alinement with the bore of the member 79, said bolt 77 is caused to bear against the hardened face of the machine frame and is thus held in retracted position during one complete revolution of the drum 72 which thus causes the stock to be fed forward and then clamped. When the bolt 77 at the end of the revolution of the drum again comes into alinement with the slidable member 79, which is no longer held in advanced position by the projection 82 of the star wheel, the coil spring 78 causes said pin 77 to snap into the bore of the slidable member 79, whereby the clutch members 73 and 75 are disengaged from each other and the cam drum is automatically locked against further rotation.

From the foregoing description it will be apparent that the cam drum 72 is operated but once while the shaft 4 and sleeve 88 are operated several times. If it be desired to lock the cam drum 72 upon the shaft 4 by manual means so as to cause it to release the stock or to feed the same without waiting for the slow action of the step by step mechanism described, the handle 80$^b$, shown in Fig. 33 may be operated. The handle 80$^b$ is connected with the rod 80 which at its inner end is formed with any suitable cam projection 80$^a$ adapted to throw the slidable member 79 forward when the handle 80$^b$ is manipulated.

The cutters of the present machine are mounted in rotary cutter carriers journaled upon swinging frames. Each time a new cutter has been brought into position, the cutter-carrier frame is swung upon its pivot to move the cutter into contact with the stock. While the carrier frame is swinging toward and from the stock, it is necessary that the mechanism for rotating the cutter carriers and for regulating the distance which the carrier frame will move toward the work, be thrown out of operation. This result is accomplished by the mechanism now to be described. Referring particularly to Figs. 1, 27 and 28, the numeral 93 indicates a sleeve which is loosely mounted on the shaft 4. The sleeve 93 is enlarged as indicated by 91 in Fig. 28, and fits around the sleeve 88, being connected rigidly therewith by screws or other suitable devices. The sleeve 93 is provided with a clutch member 94 which is adapted to be engaged by a clutch member 95, suitably splined upon the shaft 4. The mechanism for throwing the clutch member 95 into and out of engagement with the clutch member 94, so as to lock the sleeves 88 and 93 upon the revolving shaft 4 when it is desired to operate the cutter-carrier, and to unlock said sleeves and thus stop the operation of the cutter carrier during the time the carrier frame is swinging forward, will be hereinafter described. As shown in Fig. 8, the sleeve 93 is provided with gear teeth which mesh with gear wheels 227 journaled on stud shafts 226 mounted in brackets 228 secured to the machine frame 1. Secured to the ends of the stud shafts 226 opposite the gear wheels 227 are wheels 225 having eccentrically disposed pins 224. Connected with the eccentric pins 224 are upwardly extending links or rods 223 secured at their upper ends, as indicated at 222, to ratchet collets 220 each having a pawl 221 to engage a ratchet 219 connected in any suitable manner with the rotatable cutter carrier 6, mounted upon the shaft 218 as shown in Figs. 8, 9, 10 and 11. It will be understood that each of the two oppositely disposed cutter-carriers 6 is journaled upon a frame 241 which is pivoted at 247 and is adapted to move the cutter-carrier toward and from the stock, a coil spring 246 being employed for forcing the cutter-carrier frame away from the work and star wheel mechanism, hereinafter to be described, being employed for moving the cutter-carrier frame toward the work.

In order to lock each cutter-carrier 6 against further movement when it has been rotated by the link 223 to bring the proper cutter into position, a longitudinally movable bolt 242 provided on its upper end with an antifriction roller 244 and forced upward normally by a coil spring 243 is employed to fit into any one of a series of sockets suitably placed in the cutter-carrier. The bolt 242 is forced downward into its socket against the resistance of the spring 243 by means of a cam formation on the collet 220 as shown in Fig. 11. It will be understood that as the collet 220 is moved in one direction by the link 223 the cam formation shoves down the rod 242 and that as said collet is moved in the opposite direction, the pawl 221 moves the cutter carrier.

While the cutter-carriers may be constructed in any manner suitable for the purpose, it is preferred that said carriers be constructed as illustrated in Fig. 9, wherein the numeral 217 indicates one of the end pieces of an open-work frame in which cutters such as 214 are mounted upon bars 212 having coned ends 211 and tightening nuts 215. The cutters are properly spaced in the carrier by means of sleeves 213 surrounding the bars 212. If desired the cutters 214 may be splined upon the bars 212 as shown by 216. The shaft 218 is provided on its end with a nut 218$^a$ and extends through a bushing held in position in the frame 241 by screws such as 218$^b$.

It will be understood that each time the cutter-carrier frame is tilted toward the stock to bring a new cutter into operation, it is necessary to move the same a trifle nearer to the stock than was necessary during the operation of the preceding cutter; otherwise the cutter would not properly act upon the stock. The operation of successively moving the frame 241 and consequently the cutter-carriers nearer the work is accomplished by the mechanism now to be described.

Referring particularly to Figs. 8 and 13 the numeral 235 designates what is commonly known as a star wheel which is rotatably mounted upon a stud shaft 234 secured in any suitable manner to the lower end of the cutter carrier frame 241. The star or gage wheel 235 is provided in its periphery with a plurality of radially extending adjustable pins or screw studs 236. The gage wheel 235 is suitably rotated in a step by step manner by means of a link 229 which is connected at its upper end with the eccentrically arranged pin 224 upon the wheel 225, and at its lower end is connected at 230 in Fig. 12 with a ratchet collet 231 having a pawl 232 adapted to engage a ratchet wheel 233 suitably connected with the star wheel 235. One of the pins 236 of the star wheel 235 is always in position to abut against a swinging member 237 which is pivotally connected with the cutter carrier frame 241 as indicated at 237$^a$, and is provided at its lower end with an anti-friction roller 238 suitably journaled upon a stud shaft 239. The anti-friction roller 238 bears against a cam 240 rigidly mounted upon the lower shaft 5. It will be understood from Figs. 8 and 13 that two cams 240, and two star wheels 235 are employed, but as all these parts are of the same construction, a description of the elements on one side of the machine, will of course convey an understanding of the duplicate parts on the opposite side of the machine. In order to render clear the operation of the star wheel 235, it may be described at this point that the radial screw studs 236 are so adjusted that some of them are longer than the others, the adjustments of the studs 236 being regulated by the distance which it is desired to swing the cutter-carrier 6 toward the rotating stock. The operation of the parts just described is as follows. Each time the wheel 225 rotates, the cutter carrier 6 is rotated to bring a new cutter into position to act upon the stock, and the star wheel 235 is also rotated simultaneously with the cutter carrier 6, to bring another pin 236 into position behind the hanging member 237. The sleeve 93 on the shaft 4, which operates the wheel 225 and consequently the cutter carrier 6 as well as the star wheel 235 is then unclutched from the shaft 4, in a manner hereinafter to be described, whereby any further operation of the cutter carrier 6 or star wheel 235 is prevented. The cam 234 then operates to force the hanging member 237 back against the star wheel 235, thus swinging the upper end of the cutter carrier frame 241 toward the stock and causing the proper cutter 214 to operate thereon. It will be understood that the mechanism which throws the sleeve 93 and consequently the cutter carrier 6 and star wheel 235 into and out of operation, is automatically caused to operate in conjunction with the shaft 5 and cams 240, so that these parts are all timed to work in their proper order as will hereinafter more fully appear.

It may be explained at this time that the shaft 4 is what is known as the fast shaft and the shaft 5 is what is known as the slow shaft. That is to say the shaft 5 which carries the cams 240 for swinging the cutter carrier frames normally rotates at slower speed than the shaft 4, although the shaft 5 is adapted to be geared up with the shaft 4 in the manner hereinafter described, so as to cause the two shafts 4 and 5 to rotate temporarily at the same speed. The necessity of causing the shaft 5 to rotate faster at one time than at another, may be briefly set forth in order to facilitate an understanding of the mechanism used for this purpose. When the cams 240 first begin to swing the cutter carrier frames so as to move the cutters 214 toward the stock, it is desirable, in order to save time, that the carrier frames be moved rapidly until the cutters 214 are almost in contact with the stock, and that the speed of movement of the frames be then decreased so that the cutters will be moved very gently and slowly into contact with the stock to be operated on. The mechanism for accomplishing this result will now be described. As shown at the left in Fig. 2, the shaft 5 is provided with a gear wheel 123 which is rigidly mounted thereon and is in mesh with a small gear wheel 124, journaled upon a shaft 125 connected with a bracket 126 secured to the machine frame as shown in Fig. 15, said shaft 125 having a removable handle 127, Fig. 2, by means of which the shafts 4 and 5 can be manually rotated whenever desirable or necessary. The small gear wheel 124 is in mesh with a gear wheel 128, of practically the same size as the gear wheel 123, said gear wheel 128 being loosely mounted upon the shaft 4, but adapted to be locked rigidly thereon in a manner hereinafter to be described.

The wheel 128 is not in direct contact with the shaft 4 but surrounds a sleeve 190 loosely mounted on the shaft 4 as shown at the right in Fig. 1. The sleeve 190 carries at one end a clutch member 191, Fig. 27, adapted to be engaged by a sliding clutch member 192 splined upon the shaft 4. At its opposite end, the sleeve 190 is rigidly connected in any suitable manner with a cam drum 134 adapted to operate the turret and turret slide as hereinafter described. Loosely surrounding the sleeve 190 between the drum 134 and the gear wheel 128 is a wheel or cam drum 131. The wheel 131 is normally locked to the drum 134 by a bolt 132 backed by a coil spring 133 and formed in an ordinary and well known manner with a beveled forward end (not shown) so that said bolt can be thrown backward at proper intervals to unlock the wheel 131 from the drum 134 as hereinafter described. The wheel 131 is locked to the gear wheel 128 by a bolt 129 backed by a coil spring 130 and adapted to engage any one of a series of sockets in the gear wheel 128 so that said gear wheel 128 may be suitably adjusted with respect to the wheel or cam drum 131. The clutch member 192 splined on the shaft 4 is adapted to be thrown into and out of engagement with the member 191 by means of mechanism comprising a sleeve 193 slidably mounted on a rod 195, Fig. 27, and having an arm engaging the groove in said clutch member 192. Rigidly mounted on the rod 195 at one end of the sleeve 193 is a collar 194. The rod 195, which is longitudinally movable in the manner hereinafter described, extends through a stationary bracket 203 secured to the machine frame 1. Surrounding the rod 195 between the stationary bracket 203 and the slidable sleeve 193 is a short or weak coil spring 202. A long or strong coil spring 204 surrounds the rod 195 between the bracket 203 and a collar 205 securely fastened to the rod 195. The coil spring 204 is sufficiently strong under normal conditions to throw the clutch member 192 out of engagement with the member 191. The rod 195 adjacent to the gear wheel 128 is formed with rack teeth adapted to be engaged by a pawl or lever 196 journaled on a pin 197. A trigger member 198 journaled on a pin 199, by means of a spring 200, is pressed normally into engagement with a projection 201 on the sleeve 193. The gear wheel 128 is provided with two lugs or projections 128ª, the first one shorter than the other, so that the first projection 128ª, during the rotation of the gear wheel 128, passes the trigger 198 without touching the same, and strikes the toothed lever 196, causing the same to draw the rod 195 toward the right in Fig. 27. As soon as the rod 195 is drawn toward the right, a lever 207, shown in Fig. 8 as pivoted at 208, is forced, by means of a coil spring 209, to snap in behind a projection 206ª connected with a sleeve 206 rigidly mounted upon the rod 195. The lever 207 thus holds the rod 195 in the position to which it has been drawn by the toothed lever 196. When the toothed lever 196 draws the rod 195 to the right in Fig. 27, the trigger 198 which abuts against the projection 201, holds the sleeve 193 immovable against the tension of the small spring 202. Immediately after the short projection 128ª has operated the toothed lever 196, the long projection 128ª strikes the trigger 198 and releases it from its engagement with the projection 201, whereby the short spring 202 forces the sleeve 193 toward the right and thus throws the clutch member 192 into engagement with the clutch member 191. It will be understood that the trigger 198 and coil spring 192 are employed to prevent breakage of the teeth of the clutch members 191 and 192, for if the toothed lever 196 were permitted to move the clutch member 192 directly into engagement with the clutch member 191, the teeth of said clutch members might be broken if they were not registered properly together, whereas the spring 202, when the trigger 198 is released forces the clutch members yieldingly together and thus avoids liability of breakage.

At the moment the clutch member 192 is thrown into engagement with the clutch member 191, the fast motion of the upper shaft 4 is communicated through the clutch member 191, sleeve 190, cam drums 134 and 131, and gear wheels 128, 124 and 123 to the slow shaft 5. By reason of the fact that the gear wheel 128 on the shaft 4 and the gear wheel 123 on the shaft 5, are practically the same size, the slow shaft 5 will be rotated at the fast speed of the shaft 4 as long as the clutch members 191 and 192 are engaged with each other. The fast speed which is temporarily given to the shaft 5 by the shaft 4, causes the cams 240 to move the cutter carrier frames 241, and consequently the cutter carriers 6 and cutters 214 rapidly toward the stock, thus saving time. At the moment that the cutters 214 are almost in contact with the rotating stock, any one of a series of radially extending pins 210 mounted on the periphery of the cutter carrier 6 shown at the right in Fig. 8, comes into engagement with the lever 207 thus rocking said lever on its pivot and causing its lower end to become disengaged from the projection 206ᵃ on the rod 195, whereby the spring 204 is permitted immediately to move the rod 195 toward the left in Fig. 27, thus disengaging the clutch member 192 from the clutch member 191 and consequently stopping the fast motion of the lower shaft 5. As soon as the fast motion of the lower shaft has been discontinued in the manner described, the normal slow motion of said shaft 5 causes the cams 240 to move the cutters 214 slowly and gently into engagement with the rotating stock. It will be seen from the foregoing description that means have been provided for rapidly moving the cutters 214 until they are almost in contact with the stock, and for then moving said cutters slowly into contact with the stock.

As previously intimated, each time the cutter carriers 6 have been rotated by means of the connected sleeves 93 and 88, shown in Figs. 27 and 28, so as to bring new cutters 214 into position to operate on the stock, it is necessary that the mechanism for rotating the cutter carriers be thrown out of operation while the cams 240 on the lower shaft 5, are moving the cutters into contact with the stock. The mechanism for rotating the cutter carriers is thrown out of operation as previously described, by disengaging the splined clutch member 95 from the clutch member 94 and the sleeve 93. In order to facilitate an understanding of the mechanism now to be described, it may be briefly explained that in operating on certain kinds of stock, five sets of cutters 214 are mounted in each cutter carrier 6. When five sets of cutters 214 are used, it is necessary that the sleeve 93 be thrown out of operation each time a new cutter 214 has been moved into position to operate on the stock when the cutter carrier frames 241 are swung inward. That is to say the sleeve 93 is locked on the shaft 4 by means of the clutch members 94—95 and given one complete rotation, so as to move the cutter carriers 6 one step, thus bringing a new cutter 214 into position opposite the stock. The sleeve 93 is then thrown out of operation, or unlocked from the shaft 4, while the cams 240 on the lower shaft 5 are moving the cutters into engagement with the stock. It sometimes happens however that less than five sets of cutters 214 are employed in the cutter carriers 6, and that said cutters are irregularly disposed in the cutter carriers. That is to say one of the rods 212 in the cutter carriers 6 may contain one or more cutters 214; the next adjacent rod 212 in the cutter carrier, may contain no cutters 214; and the following rod 212 may contain a set of cutters 214. In such case, it will be apparent that after the first set of cutters 214 have operated on the stock, it will be necessary to move the cutter carriers 6 two steps in order to bring the next set of cutters into operation. Therefore it will be necessary that the sleeve 93 make two rotations with the shaft 4, before it be thrown out of operation to permit the cams 240 on the shaft 5 to swing the cutters into contact with work. The mechanism by which the sleeve 93 may be rotated once, twice, or more times with the shaft 4, before it shall be thrown out of operation, will now be described with particular reference to Fig. 27.

The sleeve 93, as indicated in Fig. 28, is provided with a laterally extending pin 93ᵃ which is adapted, each time the sleeve 93 makes one complete revolution, to strike one of a series of pins 102 mounted on a wheel 101 secured rigidly to a shaft 103. The wheel 101 is provided with a suitable inclined cam as shown in Fig. 27, adapted, at one point in the revolution of the wheel 101, to contact with the adjacent inclined end of the sleeve 96 slidably mounted upon the shaft 103. Surrounding the shaft 103, and rigidly secured thereto by means of a pin 100, is a cylindrical member 97 formed with an annular pocket in which is mounted a coil spring 99 adapted to press the sleeve 96 toward the wheel 191. Surrounding the cylindrical member 97 is a coil spring 98, which is suitably connected at one end with said cylindrical member 97, and at the other end with the machine frame. It will be observed that the sleeve 96 is provided with a laterally extending arm which engages the splined clutch member 95. If it is desired to move the cutter carrier 6 two steps, before bringing a cutter 214 into contact with the revolving stock, the wheel 101 is so arranged that after it has been moved two steps by the laterally extending pin 93ᵃ on the sleeve 93, the inclined cam on said wheel 101 will be brought into engagement with the inclined face of the sleeve 96 and will move said sleeve longitudinally upon the shaft 103, against the tension of the coil spring 99, so as to move the splined clutch member 95 out of engagement with the clutch member 94.

Referring particularly to Fig. 15, it will be seen that the shaft 103 on which the wheel 101 is rigidly mounted, is provided at its opposite end with a wheel 104 having in its periphery a plurality of notches 105. The notches 105 are adapted to be engaged by a pin 106 secured to a lever 107 pivotally mounted on the machine frame as indicated at 109. Each time the pin 93$^a$ on the sleeve 93, rotates the wheel 101 one step against the tension of the coil spring 98, the wheel 104 moves forward one step so that the pin 106 on the lever 107 engages a new notch 105 and thus prevents the shaft 103 and consequently the wheel 101 from being rotated backward by the coil spring 98. When the proper number of cutters 214 in the cutter carriers, have operated on the stock, and said stock has been moved forward by the feed mechanism, so as to permit the same set of cutters to operate on another portion of the stock, a suitable projection on the gear wheel 128 is adapted to strike a pin 108 on the lever 107, whereby the pin 106 becomes disengaged from the notch 105 in the wheel 104, and the coil spring 98 is permitted to rotate the shaft 103, and consequently the wheel 101 back to the point from which it started, so that the coil spring 99 acting on the sleeve 96 can move the clutch member 95 into engagement with the clutch member 94 and thus repeat the operation of moving the wheel 101 in a step by step manner until it moves the sleeve 96 in the manner described and thus disengages the clutch member 95 from the clutch member 94.

In order to regulate the extent which the shaft 103 will be reversely rotated by the coil spring 98, said shaft, as indicated by the dotted lines in Fig. 15, is provided with a ratchet member, each successive tooth of which is disposed farther away from the center of the shaft than the preceding tooth. Pivotally mounted upon a pin 112 on the machine frame, is a lever 110 having an upwardly extending ratchet arm 110' which is normally forced toward the ratchet member on the shaft 103 by means of a coil spring 111. The inner end of the lever 110 is adapted to be engaged by any one of a series of radially extending screws or adjustable pins 113 mounted on the periphery of wheel 114 which is provided with two sets of pins or projections 115 and 116. The pins 116 are adapted to be engaged by a series of pins 122 removably mounted on the hub of the gear wheel 123. If it be not desired to use the pins 122, said pins may be removed and the wheel 114 may be rotated in a step by step manner by means of a projection 123$^a$ on the wheel 123, adapted to engage the pins 115 on the wheel 114. The pins 113 on the wheel 114 are so adjusted outwardly or inwardly as to hold the lever 110 in proper position with respect to the ratchet on the shaft 103. When the lever 107 is elevated by means of the projection on the gear wheel 128 striking the pin 108 as previously described, the coil spring 98 causes the shaft 103 to be rotated backward until one of the teeth of the ratchet on said shaft 103 strikes against the arm 110' of the lever 110. In this way the number of revolutions which the sleeve 93 shall make, and consequently the number of movements which shall be given to the cutter carriers 6, are regulated by suitably adjusting the pins 113 on the wheel 114.

Referring particularly to Figs. 2 and 3, it will be seen that the means by which the shaft 4 is rotated at a fast speed, and the shaft 5 is rotated normally at a slow speed, comprises a belt wheel 261 journaled upon a stud shaft 262. The belt wheel 261 is provided with a small gear element 260 which meshes with a gear wheel 259 mounted upon the stud shaft 257 journaled in a bracket 258 on the machine frame. The stud shaft 257, as shown in Fig. 3, is provided at its inner end with a small beveled gear 256 which meshes with a large beveled gear 255 mounted on the end of the shaft 4.

The means by which the lower shaft 5 may be rotated normally at a slow speed, and may have its speed increased at suitable intervals, will now be described. The belt wheel 261 is formed with a gear wheel 263 which meshes with a gear wheel 264 mounted upon a stud shaft 267. A suitable friction disk 266 is also suitably splined upon the shaft 267, said friction disk 266 being adjustably forced in the direction of a similar friction disk 276 by means of a coil spring 269 which bears at one end against a nut 268 on the shaft 267, and at the opposite end against a plate 270 between which and the friction disk 266 is placed a circular series of anti-friction balls. Located between the friction disks 266 and 267, is a friction roller such as shown in Fig. 6 as mounted on a vertically adjustable rod 275 and comprising a soft leather or rubber buffer 271 connected with a metallic body portion 272 disposed between stationary end plates 274 and separated from said end plates by anti-friction balls. The friction member 271 serves to transmit the movement of the friction disk 272 to the friction disk 276. The friction disk 276 has suitably connected therewith a large gear wheel 279. Rigidly connected with the gear 130 wheel 279, and journaled in bushings 280ª and 280ᵇ, is a shaft 280 having a worm 281 which engages a worm wheel 282 loosely surrounding a sleeve 287 which surrounds the shaft 5. The worm wheel 282, as shown in Figs. 3 and 7 is provided with a plurality of pawls 283 mounted upon pins 284 and adapted to engage a ratchet 286 mounted on the sleeve 287. The pawls 283 are employed so that the friction disks 266 and 276 may rotate the shaft 5 at a certain slow speed, but if the speed of said shaft 5 should be increased at any time from its opposite end through the gear wheel 123, the pawls 283 will permit such increased movement. The sleeve 287 is provided at the end opposite the worm wheel 282, with a small gear wheel which meshes with a gear wheel 287ª journaled upon a stud shaft 287ᶜ. Connected with the gear wheel 287ª is a gear wheel 287ᵇ which meshes with a gear wheel 288 rigidly mounted on the shaft 5. The movement of the worm wheel 282 is transmitted through the gear wheels 287ª, 287ᵇ and 288 to the shaft 5.

In order to compensate for any wear upon the friction member 271 shown in Fig. 6, which may cause said friction member to decrease in diameter, the rod 275 on which the member 271 is journaled, is fitted into a casing 275ª which is hinged on the machine frame as indicated at 275ᵇ. When any wear occurs on the member 271, the coil spring 269 forces the friction disk 266 toward the friction disk 276.

In performing certain kinds of work, it becomes necessary that the shaft 5 after it has rotated several times shall have its speed of rotation greatly increased for a short period of time. This result is accomplished by the mechanism now to be described. As shown in Figs. 3, 4 and 5, the rod 275, carrying the friction member 271 is slidably fitted into the casing 275ª and is normally forced upward in said casing by means of a coil spring 275ᵈ. The rod is formed with a suitable slot or opening into which projects the ends of a lever 300 which is journaled at 301 upon a part of the casing 275ª and extends through a suitable slot in the casing 275ª. The end of the lever 300, opposite the rod 275 is adapted to be engaged at certain intervals by a pin or a plurality of pins 299 suitably secured to a wheel 298 journaled upon the machine frame. The wheel 298, which preferably is journaled upon a stud shaft 297ᵇ, Fig. 4, is rotated in a step by step manner by means of a suitable ratchet collet 296 which is provided with a pawl 296ª, pivoted at 296ᵇ and adapted to engage a ratchet 297 connected with the wheel 298. The ratchet collet 296 is normally drawn backward or retracted by a coil spring 295ᵇ, and is pushed forward at suitable intervals to rotate the wheel 298, by means of a link 295 which is connected with the ratchet collet 296 as indicated at 295ª. The link 295 at its upper end is pivotally connected with an angle lever 294 fulcrumed at 292 on the machine frame. The upper end 291 of the angle lever 294 is provided with a pin 290 which is adapted to be struck and operated by means of suitable inclined cams secured to the periphery of a wheel 289 rigidly mounted on the shaft 5 as indicated in Fig. 4. Each time the shaft 5, and consequently the wheel 289, rotates, the cams thereon operate the angle lever 294, which, by means of the ratchet mechanism described, moves the wheel 298 one step. It will be apparent therefore that when the shaft 5 has rotated several times, so as to rotate the wheel 298 in a step by step manner, until the pin or pins 299 thereon engages and operates the lever 300, the rod 275, carrying the friction member 271 will be moved downward in the casing 275ª, against the tension of the coil spring 275ᵈ. The friction member 271 will consequently be moved toward the periphery of the friction disk 266 and toward the center of the friction disk 276, whereby the speed of the friction disk 276, and consequently the speed of the shaft 5, will be greatly increased until the pin 299 on the wheel 298 moves out of engagement with the lever 300 and thus permits the coil spring 275ᵈ to move the friction member 271 up to its normal position, thus stopping the fast speed of the shaft 5.

The mechanism for changing the speed, and reversing the direction of rotation of the spindles 3, is controlled by the wheel 298, by means of suitable pins or screw studs 298ª removably mounted in the periphery of said wheel 298. As the wheel 298 is rotated in a step by step manner as described, the pins 298ª move into contact with, and thus temporarily elevate a lever 304 which is pivoted at 303, as shown in Figs. 2 and 5. As the lever 304 is elevated by the pins 298ª, said lever 304 in turn raises a longitudinally movable rod 305 which slides in the bracket 302, and is shaped at its upper end 306 in such a manner as to surround or engage a rod 307 which is adapted to slide back and forth in the end 306 of the member 305. As shown in Fig. 2, the rod 307 is adapted to be moved longitudinally in one direction or the other by means of a bracket 307ᵇ mounted on said rod 307 and having a suitable projection which is adapted to be struck by one or more inclined cams 307ª suitably secured to the drum 131 which is mounted upon the shaft 4 as previously described. The opposite end of the rod or slidable member 307 is bent upward and provided with a pin 307ª which is adapted, when the rod 307 is in its lowest position to fit into a slot or depression 309ª in the slidable member 309 which is connected with the lever 20 as previously described. When the rod 307 is raised to its highest position, through the vertically movable rod 305 and lever 304, the pin 307ª is adapted to fit into the slot or notch 310ª in the slidable member 310 which is connected with the lever 40 as indicated at 40ª. When the rod 307 is raised to an intermediate position the pin 307ª will engage neither one of the slidable members 309 and 310. From the foregoing description it will be apparent, that the operation of the spindles 3 can be controlled by suitably regulating the pins 298ª in the periphery of the wheel 298 so that said pins at the proper time operate the lever 304 and thus raise the rod 307 so as to cause its pin 307ª to engage one or the other of the members 309 and 310. The inclined cams 307ᵈ on the drum 131 then act at the proper time to move the rod 307 in one direction or the other so as either to change the speed or to reverse the movement of the spindles, as will be understood by those skilled in the art to which the invention relates.

In forming machines wherein a turret is employed for operating on stock, it has been customary to rotate the turret from one position to another during the return or backward movement of the turret slide. In other words the return movement of the turret slide is utilized through suitable mechanism to accomplish the rotation of the turret. This practice of rotating the turret during either the backward or forward movement of the turret slide, is objectionable, by reason of the fact that it is necessary to move the turret a certain distance away from the stock, so that the stock is entirely out of engagement with the turret, before the turret can be rotated; otherwise the stock would be bent or broken by the turret. For this reason in forming machines it has been necessary to move the turret slide for a considerable distance, first in order to disengage the turret from the stock, and second to rotate the turret. According to the present invention, it is proposed to rotate the turret always while the turret slide is stationary. After the turret has been rotated to the proper position, the turret slide is moved forward so as to bring the turret into engagement with the stock. After the stock has been operated on, the turret slide is moved backward until the turret is out of engagement with the stock. The turret slide then remains stationary while the turret is again rotated. In this way it is only necessary to move the turret slide forward a distance sufficient to move the turret into contact with the stock. After the stock has been operated on, the turret slide is moved backward until the turret is out of engagement with the stock. The turret slide then remains stationary while the turret is again rotated.

According to the present invention, it is also possible to rotate the turret one or more times, without moving the turret slide forward, whereby one or more tools in the turret slide can be skipped whenever necessary. Furthermore it is possible according to the present construction to regulate the distance which the turret will move toward the work. The mechanism by which the foregoing results are accomplished will now be described with particular reference to Figs. 16, 17, 18, 19, 32, 35 and 36.

The reference numeral 135, in Fig. 18, represents an anti-friction roller which is adapted to be engaged by the cam projections on the cam drum 134. The roller 135 is suitably journaled upon the slidable member 136 which is consequently moved back and forth by the rotation of the cam drum 134. The slidable member 136, as shown in Fig. 17 is formed on one side thereof with a lateral projection 136ª which is formed with beveled ends. The projection 136ª is adapted to engage a similar lateral projection on a pin or slidable locking member 137 which is forced normally upward by means of a coil spring 139. When the locking member 137 is in raised position, it fits into a suitable socket in the turret slide 8, and locks the same against movement. When however, the slidable member 136 moves forward or backward, the beveled ends of the projecting portions 136ª engage the locking member 137 and move the same downward so as to unlock the turret slide 8. As shown in Fig. 14, the sliding member 136 is formed on the upper portion thereof with a pair of beveled lugs 136ᵇ adapted to receive the forward end of a lever 141 pivoted at 142 upon a turret operating member 144 which, as shown in Fig. 16 is adapted to slide back and forth in a suitable slot in the turret slide 8. The rear end of the lever 141 is normally pressed upward by means of a coil spring 143. Pivoted upon the forward end of the turret operating member 144, as indicated at 160, is an arm or lever 158 which is pressed normally into engagement with any one of a series of pins 157 on the turret 155 by means of a coil spring 159.

Mounted in the stationary support on which the turret slide 8 moves, is a pin 171 the inner end 171ª of which is adapted at certain times to be pushed inward so as to contact with a suitable beveled portion (not shown) on the forward end of the lever 141 and force said forward end upward as indicated in Fig. 17 thus moving the inner end of said lever downward against the tension of the coil spring 143. As soon as the lever 141 is moved into the position shown in Fig. 17, the portion 141ª of said lever is tripped out of engagement with the slot 141ᵇ formed in the turret slide 8. The forward end of the lever 141 however is still engaged by the lugs 136ᵈ on the sliding member 136, for which reason as said sliding member moves forward it carries with it the lever 141 and consequently the turret operating member 144, although the turret 8 remains stationary. As the turret operating member moves forward, while the turret slide 8 remains stationary, the turret 7 is rotated one step. The pin 171, which as just described, is adapted to trip the lever 141, is normally forced outward by means of a coil spring 172. The pin 171 is forced inward to trip the lever 141 at suitable intervals by means of a series of removable pins 170 suitably secured to a rotary controlling drum 167 journaled in the bracket or casing 168ᵃ by means of stud shafts 169. The controlling drum 167 is constrained to move in a step by step manner as hereinafter described, by means of a pin 188 forced against the end of the drum by a coil spring 189 as shown in Fig. 16. The controlling drum 167 is rotated in a step by step manner by means of a link 178, shown in Fig. 18, connected at its lower end with a lever 180, as indicated by 179. The inner end of the lever 180, which is pivoted at 181 is drawn upward by means of a coil spring 183. The lever is operated once on each revolution of the drum 134 by means of a pin 184 mounted on said drum. The upper end of the link 178 is pivotally connected at 177 with a ratchet collet 176 having a pawl 175 adapted to engage a ratchet 174 mounted on the controlling drum 167. It will be understood that each time the drum 177 is rotated in a step by step manner so as to bring one of the pins 170 into contact with the pin 171, said latter pin is forced inward so as to trip the lever 141 in the manner previously described. The pins 170 can be regulated or adjusted so as to force the locking pin 171 inward different distances. When the pin 171 is moved a short distance, the rear end of the lever 141 is tripped out of the slot 141ᵃ; but if said locking pin 171 is pushed farther inward, the forward end of the lever 141 is raised above the beveled lugs 136ᵇ so that the turret slide and turret both are thrown out of operation. Adjustably mounted in a longitudinal slot 167ᵃ formed in the controlling drum 167 is a radially extending arm or pin 166 which is adapted to be struck by a downward projection 165, Figs. 18 and 19, connected with a shaft 162 having a handle 164. Mounted on the inner end of the shaft 162 is an arm 161 which is adapted, when in the position shown in Fig. 17, to force downward the rear end of the lever 141. The pin 166 on the controlling drum 167 is employed for regulating the distance to which the turret slide 8 will be moved forward by the sliding member 136.

The action of the parts is as follows. When the pin 171 has not been pressed inward by one of the pins 170 on the controlling drum 167, the rear end of the lever 141 is in engagement with the forward end of the slot 141ᵇ on the turret slide 8. As the sliding member 136 moves forward, the lever 141 causes the turret slide 8 also to move forward until the projection 165 on the shaft 162 strikes the pin or arm 166, so that the shaft 162 is rotated thus causing the arm 161 to force downward the rear end of the lever 141. The lever 141 with the turret operating member 144 and the sliding member 136 may then continue to move forward, but the turret slide 8 will remain stationary at the point where it was when the arm 161 pressed downward the rear end of the lever 141. On the rearward movement of the member 136 and turret operating member 144, the rear end of the lever 141 snaps up into the slot 141ᵇ, and by contact with a shoulder 141ᶜ in said slot, moves the turret slide 8 back to its rearmost position.

The turret 155 is locked in any position to which it has been turned by means of a locking bolt 150, the forward end of which is adapted to fit into any one of a series of openings 155ᵃ in the base of the turret. At its rear end the locking bolt 150 is formed or provided with a rod which is surrounded by a coil spring 151, the function of said coil spring being to force the locking bolt 150 normally into engagement with one of the sockets 155ᵃ of the turret. Extending through a suitable slot formed in the locking bolt 150 is a lever 147 which is pivotally mounted at 148. The free end of the lever 147 engages a suitable socket or slot in a slide block 146. The slide block 146 is loosely connected with the turret operating member 144 by means of a suitable rod 145 having a nut or enlargement on its rear end. The nut or enlargement fits into an enlarged bore formed in the block 146 as indicated by the dotted lines in Fig. 16. The construction is such that when the turret operating member 144 has moved the turret slide rearwardly, and is then tripped away from the shoulder 141ᶜ by the pin 171, so as to continue to move to the right in Fig. 16, the block 146 is also moved rearwardly. As the block 146 moves rearwardly it swings the lever 147 on its pivot and thus retracts the locking member 150 from its engagement with the turret base 155. When the turret operating member 144 has moved the block 146 to its rearmost position, and said turret operating member 144 begins to move forward to rotate the turret 155, the block 146 remains stationary in the rear portion of the turret slide 8 until the turret operating member 144 has almost reached the limit of its movement in the forward direction. At this point the enlargement on the rod 145 strikes the forward end of the enlarged bore shown by the dotted lines and causes the block 146 to move forward. The shape of the lever 147 as shown clearly in Fig. 16 is such that when the block 146 is in its rearmost position, said lever holds the locking member 150 retracted, but as soon as the block 146 is drawn slightly forward by the rod 145, the coil spring 151, as well as the coil spring 149 which engages the lever 147 acts to throw the locking member 150 forward into engagement with the turret 155, said springs at the same time acting to throw the block 146 into the position shown in Fig. 16. It will be apparent therefore that the action of the parts is as follows:—The turret operating member 144 moves rearwardly, pushing with it the member 146 which retracts the locking member 150. The member 144 then moves forward to rotate the turret, while the block 146 remains stationary to hold the locking member 150 in retracted position. When the member 144 has almost reached its forward position, the rod 145 gives an initial movement to the block 146 and the springs 149 and 151 move said block 146 forward the rest of the way, as previously described. The lever 147 is formed with a shoulder 147ª which acts to prevent any accidental rearward movement of the locking member 150 until the block 146 has begun its rearward movement. In order to prevent any loosening of the locking member 150 through wear, a wedge shape member 152 is arranged at one side thereof, said wedge member 152 being adapted to be moved forward slightly from time to time by means of a screw or bolt 153, which is swiveled to the rear end of the wedge 152 in any suitable manner.

As shown in Figs. 35 and 36, the controlling drum 167, in addition to the pins 170 and 166 is provided in its periphery with one or more pins 185 which at one point in the revolution of the drum 167 is or are adapted to strike and raise the inner end of a lever 186 pivoted at 187. When the inner end of the lever 186 is in lower position, as indicated by the dotted lines Fig. 35, said lever is adapted to engage the beveled end of the locking bolt 132, shown in Fig. 14, whereby said bolt is thrown backward against the tension of the spring 133, so as to unlock the drum 134 from the drum 131.

From the foregoing description it will be apparent that the controlling drum 167 can be employed for operating the rod 171 and thus causing the turret operating member to move forward and turn the turret, without moving the turret slide 8. Furthermore said controlling drum 167, through its pin 166, can be employed for striking the projection 165 on the lever 162 in Fig. 19 and thus causing the forward movement of the turret to be arrested at any desired point according to the adjustment of the pin 166. Moreover said controlling drum 167 can be employed for operating the lever 186 in Fig. 35 so as to unlock the drum 134 at any desired time.

As shown in Fig. 8, the rotating stock projecting from the spindles 3 rotates against or in contact with suitable anti-friction rolls 251 and 252 mounted in supports 250 which are connected in any suitable manner with a work head 249. The work head 249 at its lower end has a sliding or dove tail connection with the machine frame as shown in Fig. 8, and is held in position by means of a suitable wedge 249ª. Leading into the work head 249 is an oil supply pipe 254 which communicates with suitable oil ducts 253 adapted to feed oil down on to the rotating stock. By providing supports such as 250 having anti-friction rolls or cylinders therein, a considerable length of stock may be operated on by the cutters 214. In forming machines of a character somewhat similar to the present invention, it has been impossible to operate on more than a small portion of the stock in view of the liability that the stock would bend away from the cutters. According to the present invention however the supports 250 with the anti-friction rolls or cylinders serve to brace the stock and prevent the same from bending away from the cutters even when said cutters are acting on an extended length of stock.

In order to prevent any accidental rotation of the cutter carriers 6 while the cutter carrier frames 241 are moving the cutters 214 toward the stock, I provide suitable mechanism such as shown in Figs. 8 and 27, wherein the numeral 400 indicates a locking bolt which is pressed normally against the periphery of the wheel 101 by means of a coil spring 401. The wheel 101 is formed with a suitable notch 101ª, as indicated in Fig. 8, to receive the end of the locking bolt 400 when said wheel 101 is in the position shown in Fig. 27; that is, when the wheel 101 is in position to hold the splined clutch 95 out of engagement with the clutch 94 and consequently prevent any operation of the mechanism for rotating the cutter carriers 6 or the star wheels 235. Connected with the outer end of the locking bolt 400 is a lever 402 pivoted at 403. When the lower end of the cutter carrier frame 241 is swung inward, so that the upper end is swung outward to move the cutters 214 out of contact with the stock, said lower portion of the frame 214 contacts with the lever 402 and draws the locking bolt 400 outward, whereby the shaft 103 and wheel 101 can be reversely rotated by means of the spring 98 as previously described and the clutch member 95 can engage the member 94 so as to operate the mechanism for rotating the cutter carriers 6. It will be apparent therefore that the locking bolt 400 prevents rotation of the cutter carriers except when the upper ends of the frames 241 are swung outward.

Having thus described my invention, I claim—

1. In a forming machine, the combination with the cutter-carrier and cutters, the operating cam, and the rocking frame carrying said cutters and operated by said cam, of means for regulating the depth of the cut of the cutters, said means comprising a wheel having screw-studs in its periphery and rotatively mounted in the frame carrying the cutters, and a swinging member on said frame interposed between the star-wheel and the operating cam, substantially as set forth.

2. In a forming machine, the combination with the cutter-carriers rotatively mounted in a rocking frame, the said frame, the cutters in the cylinder, and the shaft and cam for feeding the cutters up to their work, of the swinging member on the frame, the anti-friction roller on said swinging member for the cam to bear upon, and the star-wheel, rotatively mounted in the frame and provided with radial screw-studs in its periphery, said studs being adapted to take behind and bear on the back of said swinging member substantially as set forth.

3. In a machine for the purpose specified, the combination with the cutter-carriers and cutters, the movable frame in which said carriers are mounted, the swinging member, provided with an anti-friction roller, and the star-wheel, provided with studs in its periphery, said wheel being mounted in the frame and adapted by rotation to bring said studs to bear in succession on the back of the swinging member, of a rotating cam adapted to bear on the anti-friction roller for bringing the cutters up to their work, and automatic means for imparting intermittent rotation to said star-wheel, substantially as set forth.

4. In a forming machine, the combination of a pair of spindles to carry and rotate the stock, a head disposed within the space between the prolongation of the axes of said spindles, anti-friction rolls carried by opposite sides of said head to serve as work supports, and a plurality of movable cutters for acting on the stock of each spindle.

5. A forming machine having two spindles for the stock abreast and at substantially the same level, a head disposed between the prolongations of the axes of the spindles, work-supports mounted in the respective outer faces of said head, and two sets of movable cutters and their carriers disposed oppositely to the respective work-supports.

6. A machine for the purpose specified, having two parallel spindles for carrying the stock, means for rotating said spindles, a head disposed within the space between the prolongation of the axes of said spindles, work-supports mounted in the respective opposite faces of said head, two cutter-carriers disposed opposite to the respective work-supports and movable up to and from the same, and means for moving the cutter-carriers up simultaneously to the work.

7. A forming machine having a turret slide, a rotatable turret thereon, mechanism for rotating the turret while the slide is stationary and for moving the slide while the turret is held against rotation, and adjustable, automatically-acting means for controlling the operations of the turret and turret slide independently of each other, and for automatically stopping the forward movement of the turret slide at any desired point.

8. A forming machine having a pair of spindles arranged in different vertical planes, cutter carriers arranged to hold cutters at different longitudinal points thereon, work rests having portions disposed opposite all points on the cutter carriers where cutters can be arranged and a turret having tangential openings to receive the stock carrier by said spindles.

9. A forming machine having stock gripping mechanism, a shaft, an operating member mounted on said shaft for operating said gripping mechanism, a locking member for normally locking said operating member against movement, and a clutching device connected to and operated simultaneously with said locking member for locking said operating member to said shaft when said locking member is moved to unlocked position.

10. A forming machine having stock gripping mechanism, a shaft, a cam member loosely mounted on said shaft for operating said gripping member, a longitudinally movable locking member connected with said cam member for holding the same normally against movement and a clutching device operated by said locking member for clutching said cam member on said shaft.

11. A forming machine having a turret slide, a turret on said slide, a turret-slide operating member movable on said turret slide independently thereof, means for locking said turret-slide operating member to said turret slide to cause it to move the turret slide, and a uniform throw device adapted to move said turret-slide operating member.

12. A forming machine having a turret slide, a turret on said slide, a turret-slide operating member capable of movement independent of the slide, means for locking said turret-operating member to said slide for moving the slide, and means for moving said turret-slide operating member.

13. A forming machine having a turret slide, a turret on said slide, a turret-operating member adapted to be locked in engagement with the slide for moving the same, and automatic means for unlocking the turret-operating member from the slide to stop the slide at any desired point.

14. A forming machine having a turret slide, a turret on said slide, a turret-operating member, a uniform throw device for operating the turret-operating member, a cam drum for operating the uniform throw device, and means operated by said cam drum for controlling the operation of the turret-operating member by the uniform throw device.

15. A forming machine having a turret slide, a turret thereon, a turret-operating member, a uniform throw device adapted to be engaged by the turret-operating member, and automatically acting mechanism for disconnecting the turret-operating member from the uniform throw device.

16. A forming machine having a turret slide, a turret thereon, a turret-operating member adapted to be engaged with the turret slide for moving the same, operating mechanism for the turret-operating member, automatic means for controlling the engagement of the turret-operating member with its operating mechanism, and automatically acting means for throwing the operating member out of engagement with the turret slide to stop the movement of said slide at any desired point.

17. A forming machine having a turret slide, a rotatable turret thereon, a turret-operating member mounted for sliding movement on the turret slide, and adapted to be engaged with the turret slide for moving the same, a uniform throw device for operating the turret-operating member, a cam drum for operating the uniform throw device, a pin cylinder operated by the cam drum, and means operated by the pin cylinder for controlling the engagement of the turret-operating member with the uniform throw device and for controlling the engagement of the turret-operating member with the turret slide to stop the slide at any desired point.

In witness whereof I have hereunto signed my name this 28th day of Dec., 1905, in the presence of two subscribing witnesses.

JAMES D. MATTISON.

Witnesses:
HENRY CONNETT,
H. G. HOSE.